US011144179B2

(12) United States Patent
Sultan (10) Patent No.: US 11,144,179 B2
(45) Date of Patent: Oct. 12, 2021

(54) NEXT USER INTERACTION PREDICTION (71) Applicant: SAP SE, Walldorf (DE)

(72) Inventor: Arshad Sultan, Bangalore (IN)

(73) Assignee: SAP SE, Walldorf (DE)

( * ) Notice: Subject to any disclaimer, the term of this patent is extended or adjusted under 35 U.S.C. 154(b) by 97 days.

(21) Appl. No.: 16/382,804

(22) Filed: Apr. 12, 2019

(65) Prior Publication Data

US 2020/0326822 A1    Oct. 15, 2020

(51) Int. Cl.
*G06F 3/0484* (2013.01)
*G06F 3/0481* (2013.01)
*G06N 3/08* (2006.01)

(52) U.S. Cl.
CPC ........ *G06F 3/0484* (2013.01); *G06F 3/04812* (2013.01); *G06N 3/08* (2013.01)

(58) Field of Classification Search
CPC ........ G06F 3/0484; G06F 3/0481; G06N 3/08
See application file for complete search history.

(56) References Cited

U.S. PATENT DOCUMENTS

| 6,323,884 | B1  |   | 11/2001 | Bird et al. |
| 9,197,716 | B2  |   | 11/2015 | Igelka |
| 9,245,225 | B2  | * | 1/2016  | Winn .................... G06F 16/337 |
| 2011/0270794 | A1 | * | 11/2011 | Drory ..................... G06N 7/02 |
|  |  |  |  | 706/52 |
| 2016/0358071 | A1 |   | 12/2016 | Grefenstette et al. |
| 2018/0183891 | A1 |   | 6/2018  | Zhang et al. |
| 2018/0188918 | A1 |   | 7/2018  | Tyebkhan et al. |
| 2018/0260693 | A1 |   | 9/2018  | Dahlmeier et al. |
| 2018/0349446 | A1 |   | 12/2018 | Triolo et al. |
| 2018/0365025 | A1 |   | 12/2018 | Almecija et al. |

\* cited by examiner

*Primary Examiner* — Andrea C Leggett
(74) *Attorney, Agent, or Firm* — Fountainhead Law Group P.C.

(57) ABSTRACT

In some embodiments, a method receives a set of interactions regarding interactions with an application and generates a plurality of sequences from the set of interactions. Each sequence includes multiple interactions. A plurality of results are generated for the plurality of sequences where a result in the plurality of results is a result for a sequence in the plurality of sequences. The method then trains a prediction network using the plurality of sequences and the plurality of results. The prediction network is usable to predict a next user interaction on the application when being used on a user interface.

20 Claims, 7 Drawing Sheets

NEXT USER INTERACTION PREDICTION

BACKGROUND

When using a user interface, a user may perform various actions. For example, a user may select different menu items, may input information into entries, etc. Also, the user may navigate to different screens of the application. Each different screen may include various menu items, buttons, entry boxes, and other elements. The user then can perform whatever actions are desired.

Some screens may include a large number of elements in which the user can select or provide input. Sometimes, a user may spend a large amount of time to find an element for the next user input that is desired. And some interactions may take a large amount of time to complete after the user has provided an input. All this may be an inefficient use of the user's time.

DETAILED DESCRIPTION

Described herein are techniques for a prediction system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments predict a next interaction for a user that is using an application being displayed in a user interface. For example, after receiving an interaction on the application, a prediction network predicts the user's next interaction on the application. Then, the application can perform an action using the prediction, such as suggesting the next interaction on the application being displayed in the user interface. For example, the application may highlight an element of the application being displayed in the user interface. Also, the application may pre-load objects before the user manually requests the objects. Additionally, the application may automatically personalize itself (e.g., by rearranging, adding, or subtracting elements) based on the prediction to enhance the experience of the user. The above actions enhance the user experience by conforming the application to the usage patterns of the user.

To predict the user's next interaction, a prediction network may be trained. Some embodiments pre-process a set of interactions to generate sequences of interactions that are used to train the prediction network. Then, some embodiments select a result for each sequence from the interactions. The sequences and results are then used to train the prediction network. Using the sequences of interactions and the results of the sequences to train the prediction network provides an accurate prediction of the next interaction when the user is using the application in real time.

System

Figure 1:
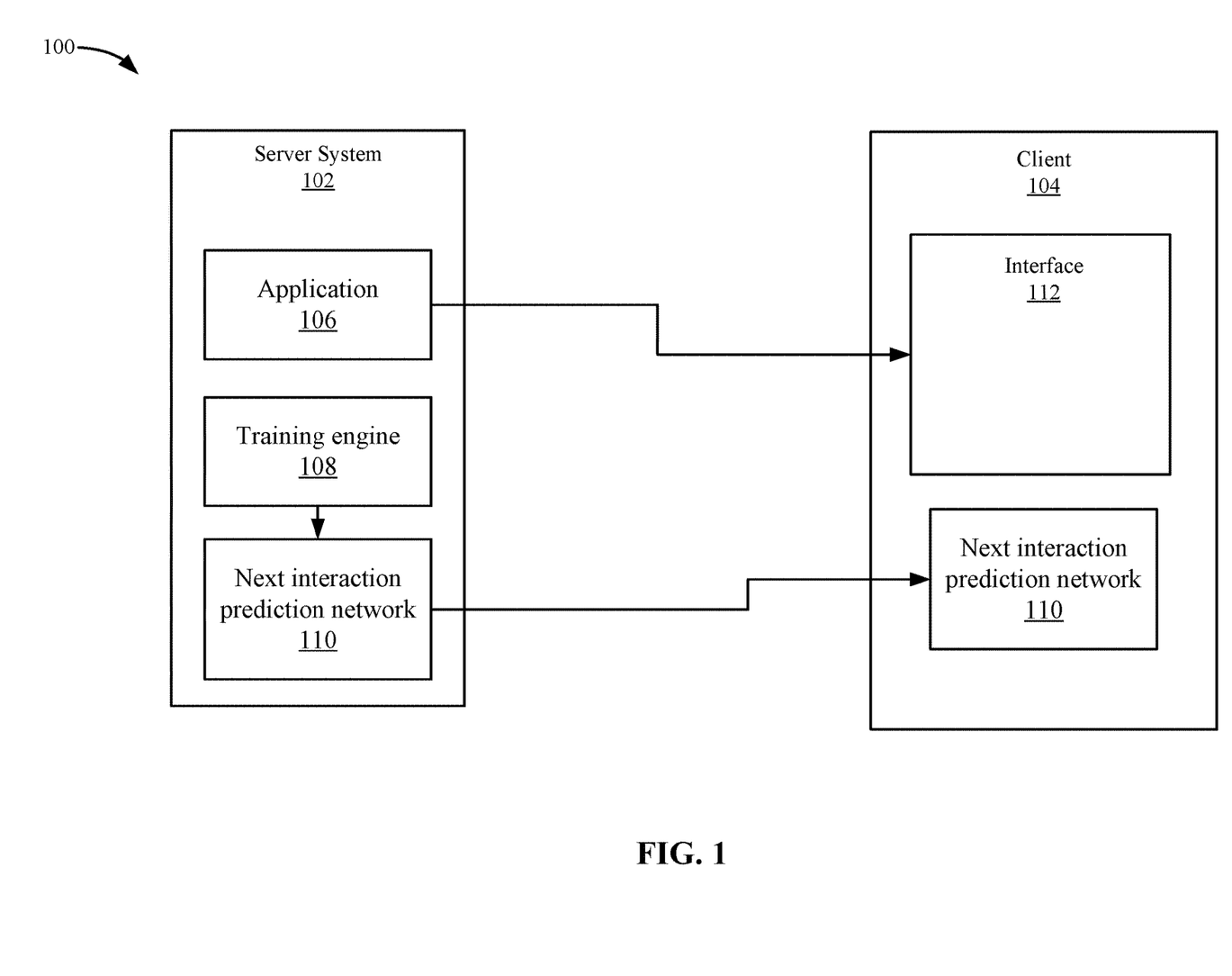
FIG. 1 depicts a simplified system for predicting a next interaction according to some embodiments.

FIG. 1 depicts a simplified system 100 for predicting a next interaction according to some embodiments. A server system 102 provides an application 106 to a client 104. In this example, application 106 executes on server system 102 and a user interface 112 displays screens from application 106 on client 104. However, other configurations may be appreciated, such as application 106 may be executing on client 104 (e.g., not remotely on server system 102).

Application 106 may be any type of application in which a user interacts with screens of application 106. A screen may be a view of information in application 106, such as various screens in which interactions may be performed. Some interactions may be a user can input information on the screen, select menu items, etc. In some examples, a first screen may be a screen to input purchase orders, a second screen may be a screen to input invoices, etc. Each screen may include elements, such as menu items, entry boxes, etc.

Server system 102 includes a next interaction prediction network 110 that can predict a next interaction for a user that is using application 106. The next interaction may be any type of possible interaction with application 106 that a user would perform. The interaction may be physical actions, such as selecting an element of application 106 or visual actions, such as viewing an element (e.g., through a virtual reality system). Examples of user actions include selecting a menu item, inputting information in an entry box, viewing another screen, viewing an element on a screen, etc. Application 106 may then perform an action based on the next interaction prediction, such as highlighting an element the user might use next, loading an object that a user may require next, moving menu items around based on what a user might select next, etc.

Next interaction prediction network 110 is a prediction network, which may be a neural network that receives input and then predicts the next interaction. In some embodiments, next interaction prediction network 110 may generate a prediction based on a sequence of interactions. For example, next interaction prediction network 110 makes a prediction based on remembering a sequence of interactions from a user. In some embodiments, next interaction prediction network 110 may be a recurrent neural network or a long-short term memory (LSTM) neural network. These types of neural networks process sequences of interactions rather than a single interaction to produce a predicted output. These types of neural networks connect previous outputs from other interactions with a current interaction to predict a next interaction.

Training engine 108 trains next interaction prediction network 110 to output the next interaction based on a sequence of interactions. In some embodiments, training engine 108 processes previous interaction data to generate training data that can optimally train next interaction prediction network 110 to predict the next interaction. As will be discussed in more detail below, training engine 108 may process the previous interaction data into interaction sequences that each include a result. For example, training engine 108 generates interaction sequences of a number N, such as ten interactions, and then the next interaction is the result. Training engine 108 uses these interaction sequences and results to train next interaction prediction network 110.

Once trained, a model for next interaction prediction network 110 is used to predict the next interaction while a user is using application 106. This model may be the result of training next interaction prediction network 110 and normally includes weight values that are trained to output the prediction based on input to next interaction prediction network 110. In some embodiments, next interaction prediction network 110 may be downloaded to client 104 and be used to predict the next interaction as a user is using application 106 on client 104. In other embodiments, next interaction prediction network 110 may execute on server system 102 and provide next interactions to client 104 as the user is using application 106.

Training Process

Figure 2:
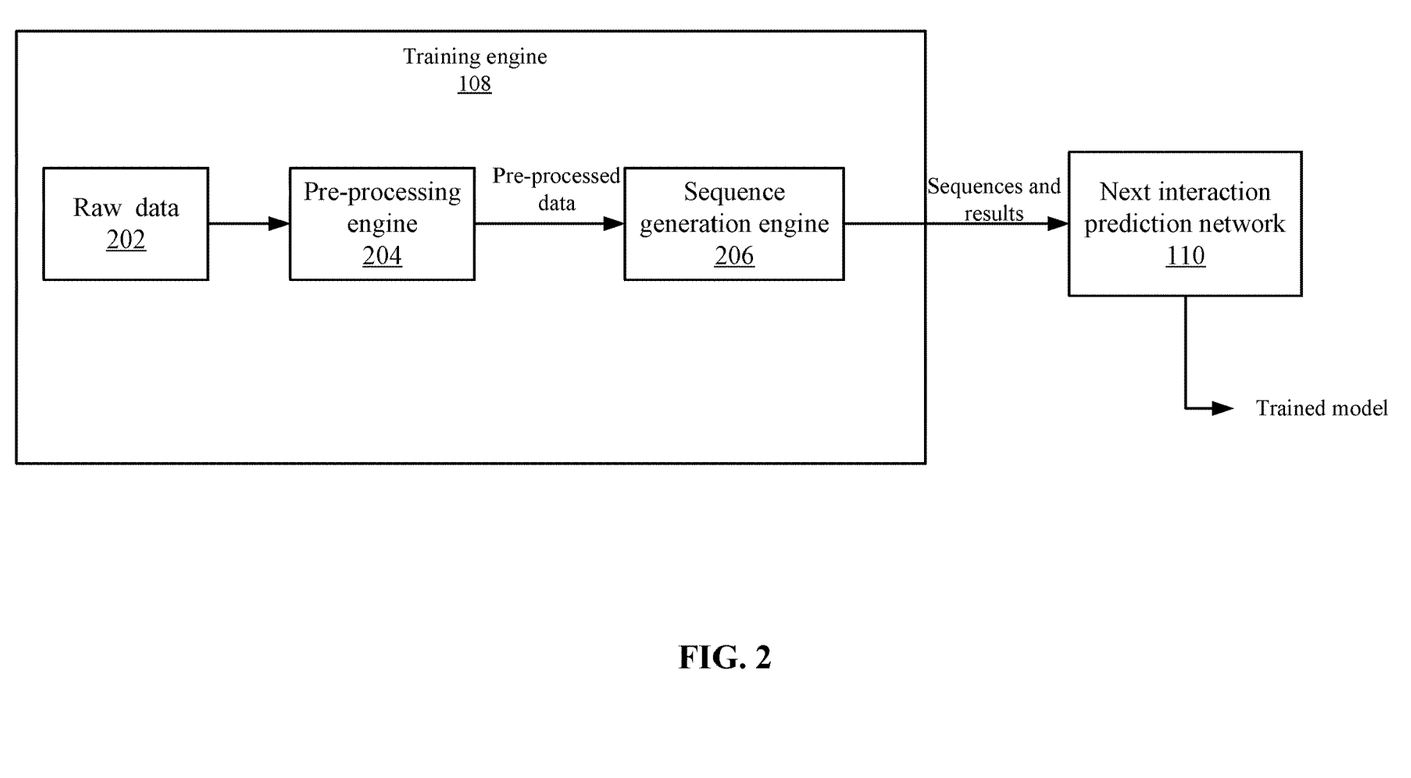
FIG. 2 depicts a more detailed example of a training engine according to some embodiments.

FIG. 2 depicts a more detailed example of training engine 108 according to some embodiments. Raw data 202 may be data that is captured from users using application 106. In some examples, application 106 may capture raw data when users make a meaningful interaction on user interface 112 while using application 106. For example, a meaningful interaction may be an action that results in application 106 collecting information about that action. A meaningful action may be when a screen and an element can be identified as being part of the action. Examples of meaningful interactions include inputting information into an entry on interface 112, selecting a button, selecting a menu item, etc. One example of a non-meaningful interaction may be the user moving a mouse around the screen. The raw data may be information about the interactions in a list of interactions.

Pre-processing engine 204 receives raw data 202 and can identify training data that may be used for training purposes. In one example, pre-processing engine 204 identifies different types of data from raw data including a screen type, a step type, user logon details, and a timestamp for each interaction. The screen type may be the screen on which the interaction is performed. For example, application 106 may include different views that display different information. One type of screen may be a sales order screen in which a user can input information for a sales order. This interaction may be identified by an identifier of "SALESORDEROIFSCREEN" in the raw data. The step type identifies an element in which the interaction was performed. For example, a user may select a button or menu item on the screen. An example of a step type may be "CLICK>Button (ID:AFS)", which indicates a selection of a button with the identifier of AFS. User log-in details may identify a user logon session for a user who performed the interaction using application 106. A timestamp may be the time at which the interaction is performed.

Pre-processing engine 204 may then pre-process the training data. For example, pre-processing engine 204 may concatenate corresponding screen and step type information together in the training data so that an interaction can be uniquely identified. The concatenation generates a list of interactions for multiple users. One example of an interaction may be: SALESORDEROIFSCREEN->Button(id: AFS)=time 2:00. The interaction string includes the screen, the action, and the time at which the action was performed.

Pre-processing engine 204 may then separate the interactions based on unique logon details. For example, pre-processing engine 204 separates the interactions per user and/or per user logon session. Pre-processing engine 204 then sorts the interactions for each user logon by timestamp. Sorting the interaction by timestamp provides a sequential version of interactions for each user logon.

After pre-processing, pre-processing engine 204 has generated sequences of interactions where each sequence represents all the user interactions that a user performed during one logon session while using application 106 on interface 112. Although the interaction sequences are sorted for each user logon session, the interactions may be sorted for each user no matter how many logon sessions were performed.

The following includes pseudocode that can be used to pre-process the training data:
Sequences=[ ]
for 1 in logons:

```
logon = SalesOrder[SalesOrder['Logon uuid'] == 1]
logon = logon.sort_values(by=['Timestamp'])
loginStepSequence = logon.screenstep
# remove adjacent duplicates
loginStepSequence = loginStepSequence.loc[loginStepSequence.shift( )
!=
loginStepSequence]
Sequences.append(loginStepSequence).
```

In the above, for each logon, each sequence is sorted by timestamp to have the correct ordering of interactions with the first interaction appearing first. Also, pre-processing engine 204 may further edit the sequences, such as by removing consecutive duplicate interactions and removing null values. These removals may increase accuracy as consecutive duplicate interactions may not add any knowledge in the sequence for predicting the next interaction as these are the same interaction and null values may also not add any knowledge about predicting the next interaction as null values do not have any value.

A sequence generation engine 206 receives the pre-processed data and then generates sequences that can be used for training. In some examples, sequence generation engine 206 determines X number of interactions for a sequence, such as ten interactions for a sequence. The sequence of interactions may be consecutive interactions that were performed by a user. However, some interactions may be removed from the interactions. Then, sequence generation engine 206 maps the sequence to a result value. For example, sequence generation engine 206 may generate the result value as the interaction that appears directly after the last interaction in the sequence, such as the 11$^{th}$ interaction if there are ten interactions in the sequence.

Figure 3:
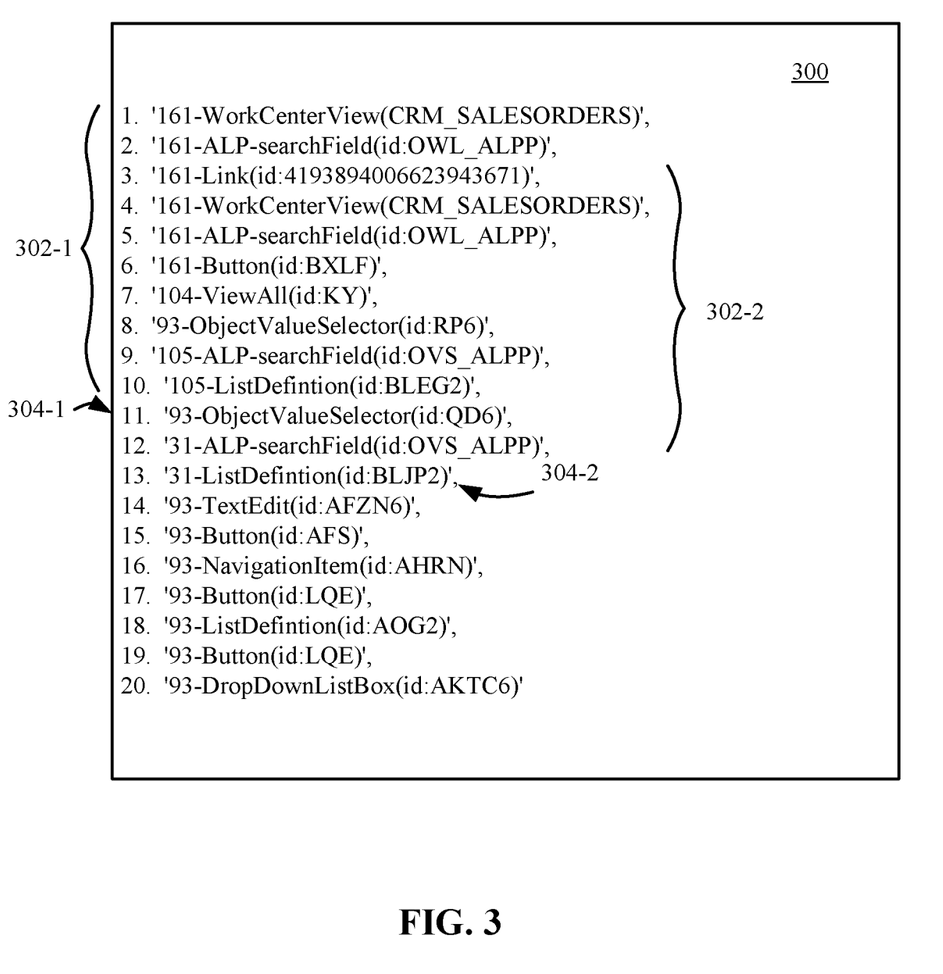
FIG. 3 depicts an example of interactions according to some embodiments.

FIG. 3 depicts an example of interactions 300 according to some embodiments. There are 20 interactions in interactions 300, but any number may be included. In the interactions, the user may navigate to different screens that are identified as "'161", or "'104", etc. These numbers may be screen identifiers. Then, the screen identifier in the interaction is associated with a step, such as WorkCenterView (CRM_SALESORDERS). Note that the user log-in information and timestamp have been omitted from the interactions.

Sequence generation engine 206 then generates multiples sequences of interactions. For example, at 302-1, sequence generation engine 206 selects the first ten interactions to form a sequence of interactions. Then, at 304-1, sequence generation engine 206 selects the 11$^{th}$ interaction as the result. For example, the result is '93-ObjectValueSelector (id:RP6)'. This indicates that after performing the ten interactions, the user is expected to perform the 11$^{th}$ interaction of selecting an object with an identifier of RP6.

Sequence generation engine 206 may continue to generate additional sequences of interactions and respective results using different methods. For example, sequence generation engine 206 may use a step size to determine the start of the next sequence of interactions. The step size may indicate an interval of interactions to skip to start the next sequence. For example, if the step size is "2", sequence generation engine 206 skips one interaction and selects the first interaction that is two interactions away from the first interaction of the last sequence. For example, at 302-2, sequence generation engine 206 selects interactions #3-12 as another sequence of ten, and then at 304-2, selects the 13$^{th}$ interaction as the result. This process may continue until all interactions have been selected in a sequence of interactions or until a threshold of sequences is generated.

The step size may vary. Also, the skipping of interactions may be used because when the raw data size is very large increasing the steps size can help to maintain most of the variance of the raw data in the training data without the training data also becoming too large, which decreases the time needed during the training process.

In some embodiments, the use of ten interactions in a sequence provides training data that optimally trains next interaction prediction network 110. For example, when using an application 106 in which a business process is being provided, a user typically may perform interactions in which ten prior interactions may provide a good prediction of the next interaction. The prior interactions help provide a good prediction because creating a new sales order and copying an existing sales order opens the same screen. However, the model is capable of predicting a different set of interactions when a sales order is created compared to when a sales order is created by copying an existing sales order. This is because the model is aware of the context with which the screen was opened. Using a number of previous interactions helps next interaction prediction network 110 maintain such context information. In some other types of applications, more or less previous interactions may be used depending on how the application is used. For example, the number of sequences may be different, such as 20 interactions may be included in a sequence.

The following is an example of pseudocode that performs the generation of the sequences and results:

```
maxlen = 10
step size = 2
interactions = [ ]
results = [ ]
for i in range (0, len(Sequences)):
    logon = Sentences[i].values
    logonLength = len(logon)
    if (logonLength > maxlen):
        for j in range(0, logonLength − maxlen, step):
            if (j + maxlen < logonLength):
                interactions.append(logon[j: j + maxlen])
                results.append(logon[j + maxlen])
```

A maximum length may be defined by a variable maxlen, which is ten interactions in this case. A step size may be when the next sequence starts after the prior sequence. In this case, the step size is "2", which means an interaction may be skipped to generate the next sequence, such as after selecting interactions #1-10, the next interaction may start at interaction #3 as the start of the next sequence, which will include interactions #3-12. Then, sequence generation engine 206 generates sequences and results for each logon based on the variables maxlen and step size.

Figure 4:
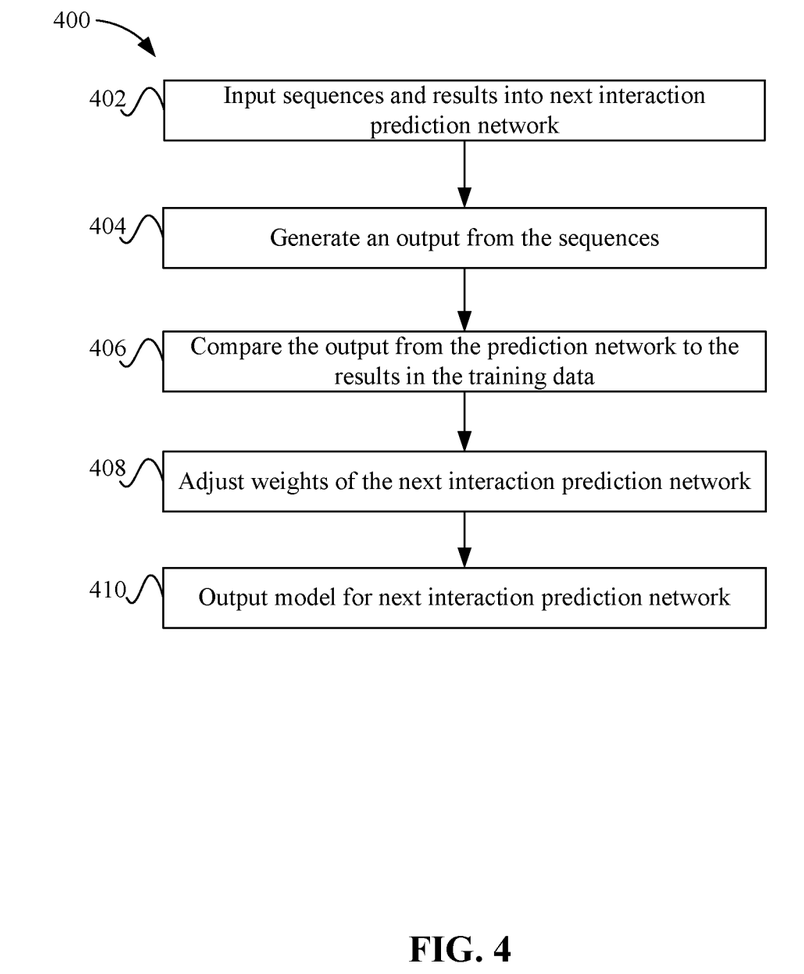
FIG. 4 depicts a simplified flowchart of a method for training a next interaction prediction network according to some embodiments.

Once generating the sequences and results is complete, training engine 108 trains next interaction prediction network 110 using the sequences and results. FIG. 4 depicts a simplified flowchart 400 of a method for training next interaction prediction network 110 according to some embodiments. At 402, training engine 108 inputs the sequences and results into next interaction prediction network 110. For example, the interaction sequences and result mappings for each logon are fed into next interaction prediction network 110. In some embodiments, a per-user training is performed such that next interaction prediction network 110 is trained using user-specific data. That is, each user has a next interaction prediction network 110 trained on the user's interactions. In this case each user would have their own model trained and used when the user is using application 106. However, the training process may also use multiple users' training data to train a next interaction prediction network 110 globally for multiple users. At 404, next interaction prediction network 110 generates an output from the sequences. These are the actual outputs that are predicted by next interaction prediction network 110 based on the interactions in each sequence. For example, from the first ten interactions, next interaction prediction network 110 predicts an output.

At 406, training engine 108 compares the outputs from next interaction prediction network 110 to the results in the training data. For example, for each sequence, the result in the training data may match the output predicted by next interaction prediction network 110. However, the result in the training data may also be different from the predicted output. Depending on the above comparisons, some adjustment to next interaction prediction network 110 may be performed. For example, at 408, training engine 108 may adjust the weights of next interaction prediction network 110 based on the comparison. In some embodiments, training engine 108 adjusts the weights such that next interaction prediction network 110 will be more likely to predict the result from the training data. The weights may be values of nodes within next interaction prediction network 110 that are used to predict the next interaction. Different values of the weights may affect the output that is predicted. Although weights are described, other parameters may be adjusted that affect the output of prediction network 110.

Once the training is finished, at 410, training engine 108 outputs a model for next interaction prediction network 110. The model includes information that is used to predict next interactions while a user is using application 106 on interface 112. For example, the model includes the weights that were adjusted.

Interaction Prediction

Figure 5:
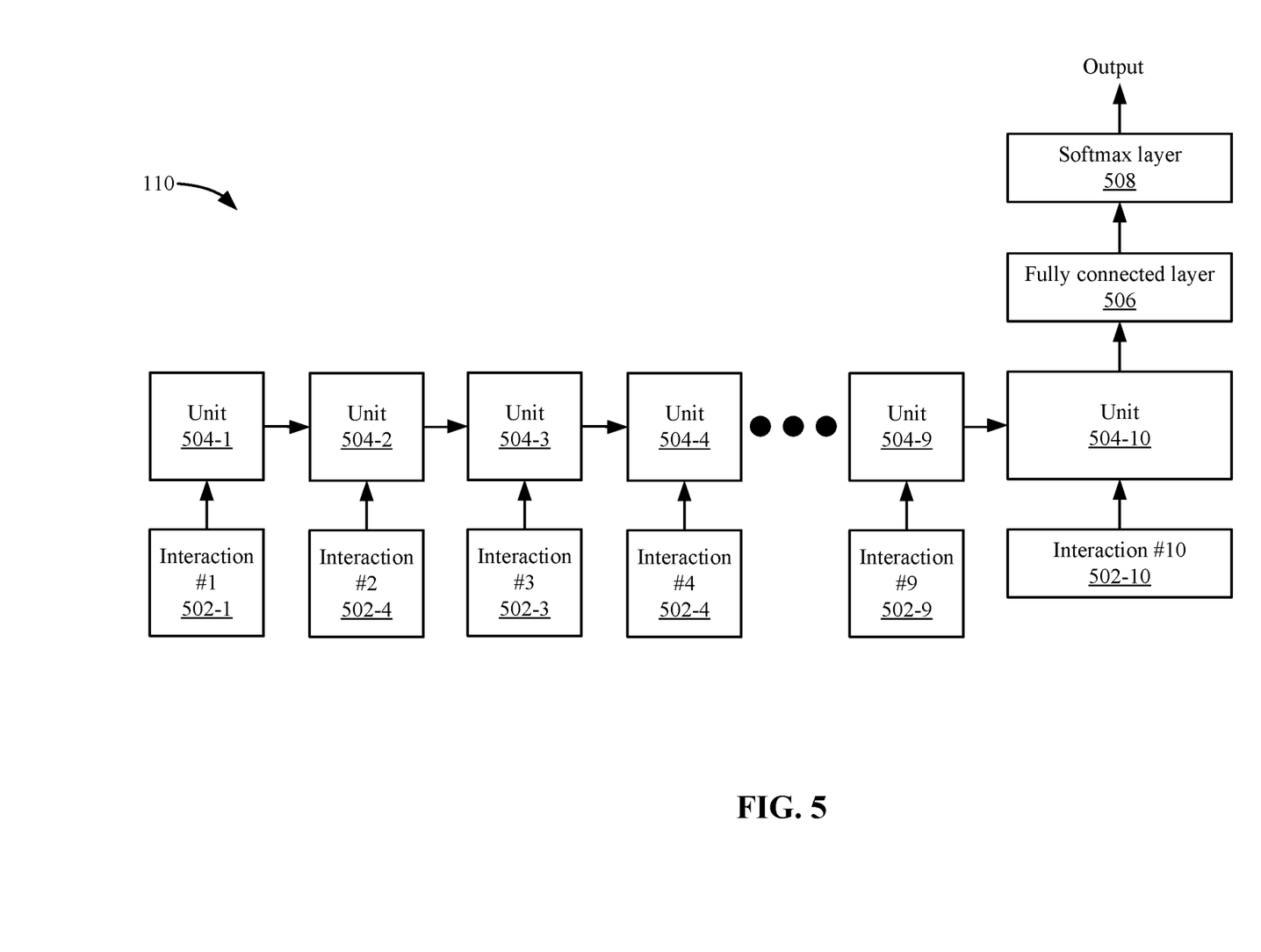
FIG. 5 depicts an example of next interaction prediction network according to some embodiments.

Once trained, next interaction prediction network 110 can be used to predict user interactions while a user is using application 106. FIG. 5 depicts an example of next interaction prediction network 110 according to some embodiments. Next interaction prediction network 110 includes a number of units 504-1 to 504-10. The number of units may be equal to the number of interactions in a sequence. For example, if there are ten interactions in a sequence, then there are ten units. Each unit 504 may receive an interaction from the sequence. After the first unit 502-1, each subsequent unit 504 may use the output from the prior unit in determining the next output. For example, unit 504-1 may receive interaction #1 502-1. Unit 504-1 then makes a prediction of the next interaction based on interaction #1. Unit 504-2 receives that prediction and also interaction #2 502-4. Unit 504-2 makes a prediction of the next interaction using that information. Then, unit 504-3 receives the prediction from unit 504-2 and interaction #3 502-3 and similarly makes a prediction of the next interaction based on that information. Unit 504-4 receives the prediction from unit 504-3 and interaction #4 502-4. Unit 504-4 makes a prediction of the next interaction, and the process continues until unit 504-10 is reached. Unit 504-10 receives the prediction of the next interaction from unit 502-9 and interaction #10 502-10 and generates a prediction. The output of unit 504-10 is a result of the states of all the previous units 504. Thus, the output takes into account the predictions of all prior units.

In some embodiments, each unit includes an internal unit size of 256. The internal unit size can be defined as the dimension of the output of an LSTM unit. The output of an LSTM unit is the result of the previous cell's output, current memory information, and the current unit's input.

The output of unit 504-10 is connected to a fully connected neural network layer 506, which converts the dimensions of the output of unit 504-10 to a format (e.g., a size of total possible interactions that can be input to softmax layer 508. By passing this output though a softmax layer 508, the output of unit 504-10 can be transformed into a list of probabilities that sum to "1" where each value corresponds to the probability of one possible interaction. Therefore, there would be as many rows as there are possible interactions (e.g., the global pool) and the value of each row corresponds to the probability that the next interaction is the interaction represented by that row. Thus, a softmax layer 508 outputs the probability of what the next interaction will be from the global pool of interactions.

Figure 6:
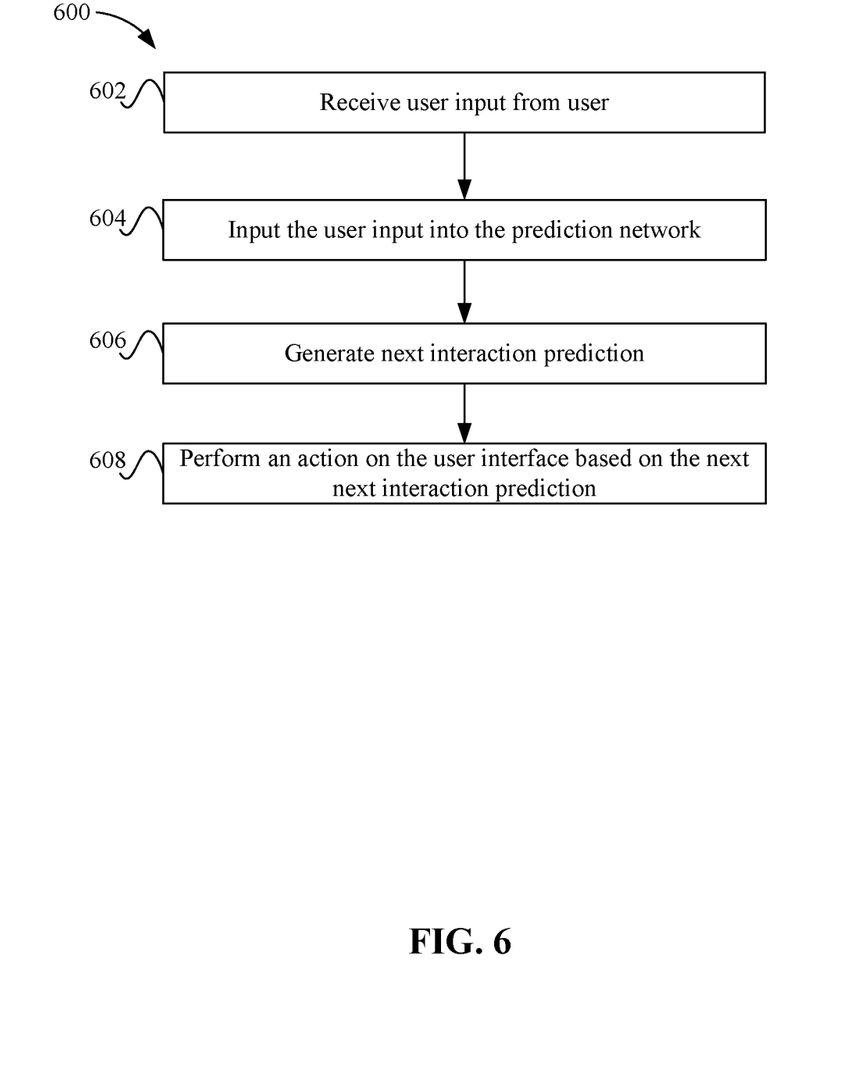
FIG. 6 depicts a simplified flowchart of a method for using the next interaction prediction network to predict next interactions according to some embodiments.

FIG. 6 depicts a simplified flowchart 600 of a method for using next interaction prediction network 110 to predict next interactions according to some embodiments. At 602, next interaction prediction network 110 receives user input from a user. For example, a user may perform a meaningful interaction on application 106.

At 604, application 106 inputs the user input into next interaction prediction network 110. At 606, next interaction prediction network 110 generates the next interaction prediction. Referring to FIG. 5, ten interactions are needed to generate the output. Assuming the user has been using application 106, the current interaction may be input at interaction #10 502-10 into unit 504-10. The previous nine interactions that a user had performed may be input into interaction #1 502-1 to interaction #9 502-9. Using these interactions, unit 504-10 generates an output. However, if application 106 has not received ten interactions, application 106 may perform various actions until ten interactions are reached. For example, application 106 may input placeholder interactions until ten interactions are reached. The placeholder interactions may be fixed interactions of one or more types. Also, the placeholder interactions may be dynamically generated based on the current interaction as the most likely interactions to occur before the current interaction.

Referring back to FIG. 6, at 608, application 106 performs an action on application 106 in user interface 112 based on the next interaction prediction. The action may be any actions that were described above, such as highlighting an entry, pre-loading objects, adjusting menu items, etc.

The prediction of the next interaction may be generated in real time either on client 104 or on server system 102. If generated using next interaction prediction network 110 on client 104, the software code for next interaction prediction network 110 may be loaded into user interface 112 (e.g., into a browser displaying application 106). User interface 112 may then directly interact with next interaction prediction network 110. Alternatively, if application 106 is executing on client 104, the software code may be loaded into application 106. In other examples, interface 112 may communicate with server system 102 to have next interaction prediction network 110 predict the next interaction. It is noted that running next interaction prediction network 110 on client 104 may reduce the time needed to determine the next interaction and allows application 106 to provide the action on user interface 112 faster before a user attempts to perform the next interaction.

Conclusion

Accordingly, some embodiments generate a next interaction using a unique sequence of training data. Applying the next interaction on user interface 112 improves the user experience on application 106, which saves time and also makes the user interface 112 more powerful.

System

Figure 7:
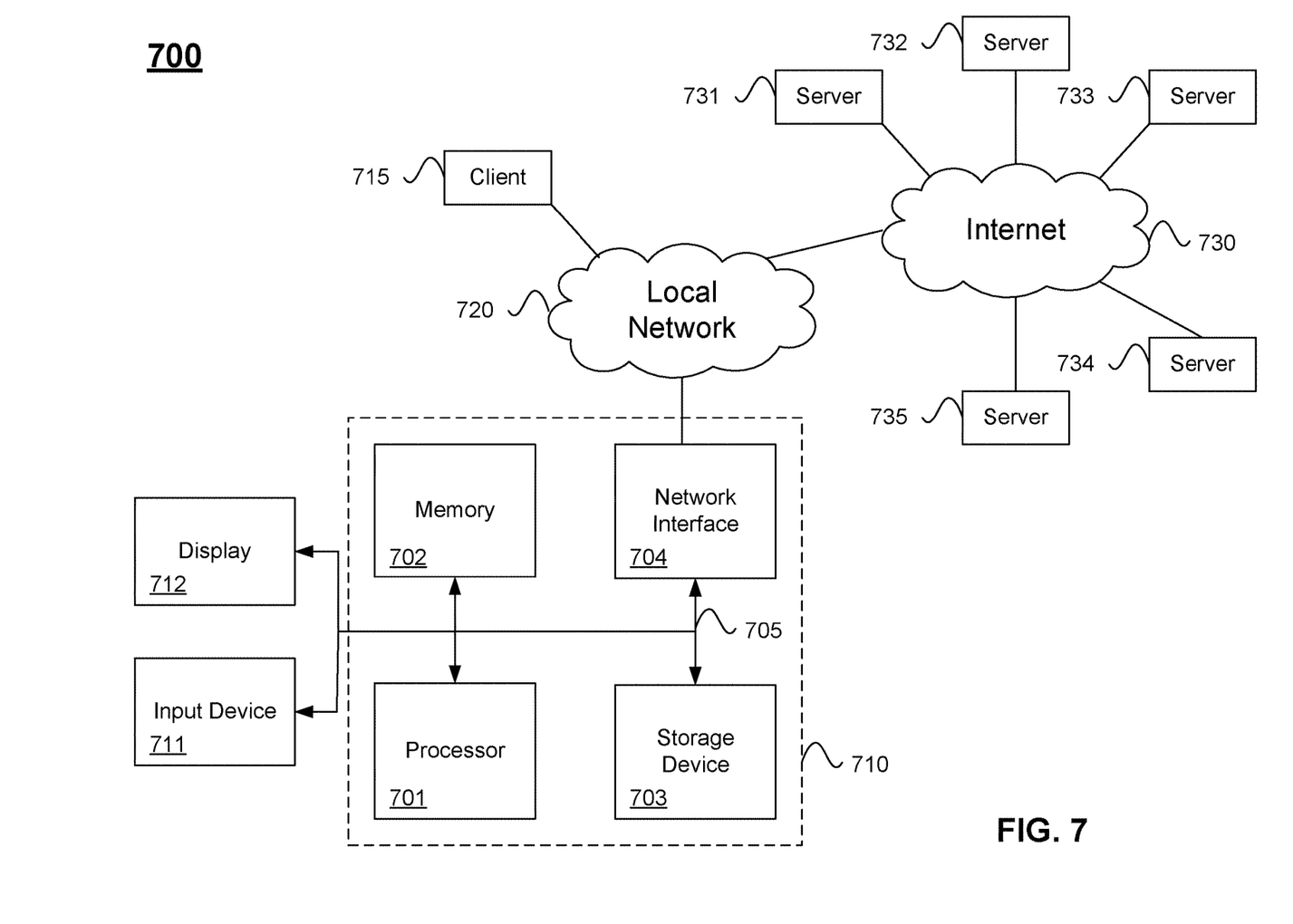
FIG. 7 illustrates hardware of a special purpose computing machine configured with the next interaction prediction network according to one embodiment.

FIG. 7 illustrates hardware of a special purpose computing machine configured with next interaction prediction network 110 according to one embodiment. An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable storage mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these elements allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information through the network interface 704 across a local network 720, an Intranet, or the Internet 730. In the Internet example, software components or services may reside on multiple different computer systems 710, clients 715, or servers 731-735 across the network. The processes described above may be implemented on one or more servers, for example. A server 731 may transmit actions or messages from one component, through Internet 730, local network 720, and network interface 704 to an element on computer system 710. The software components and processes described above may be implemented on any computer system and send and/or receive information across a network, for example.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method for predicting a user interaction, the method comprising:
   receiving, by a computing device, a set of interactions regarding interactions with an application;
   generating, by the computing device, a plurality of sequences from the set of interactions, wherein each sequence includes multiple interactions;
   generating, by the computing device, a plurality of results for the plurality of sequences, wherein a result in the plurality of results is a result for a sequence in the plurality of sequences; and
   training, by the computing device, a prediction network using the plurality of sequences and the plurality of results, wherein the prediction network is usable to predict a next user interaction on the application when being used on a user interface,
   wherein a maximum length of each sequence is defined according to a business process related to the application, and
   wherein the prediction network comprises a neural network that is trained based on the plurality of sequences, wherein the maximum length reduces a raw data size for training the neural network.

2. The method of claim 1, further comprising:
   processing interaction data regarding interactions with the application by:
   identifying a screen identifier for a screen of the application;
   identifying a step type for an element on the application; and
   concatenating the screen identifier and the step type into an interaction.

3. The method of claim 2, wherein processing the interaction data comprises:
   associating a user logon with an interaction.

4. The method of claim 3, wherein processing the interaction data comprises:
   associating a timestamp with an interaction.

5. The method of claim 4, wherein processing the interaction data comprises:
   separating the set of interactions by user logon to generate a plurality of user- specific interactions; and
   sorting each of the plurality of user-specific interactions by a respective timestamp for each interaction in each of the plurality of user-specific interactions.

6. The method of claim 2, wherein processing the interaction data comprises:
   removing consecutive duplicate interactions and/or null values in the interactions.

7. The method of claim 1, wherein generating the plurality of sequences from the set of interactions comprises:
   selecting a first number of consecutive interactions; and
   storing the first number of consecutive interactions as the sequence.

8. The method of claim 7, wherein generating the plurality of results comprises:
   selecting an interaction after the first number of consecutive interactions as the result; and
   storing the result with the first number of consecutive interactions as the result of the sequence.

9. The method of claim 1, wherein training the prediction network comprises:
   inputting a sequence of interactions into a plurality of units for the prediction network; and
   training the prediction network based on an output of the prediction network, wherein the output is compared to the result for the sequence.

10. The method of claim 9, wherein training the prediction network comprises:
    adjusting weights of the prediction network based on comparing of the output to the result.

11. The method of claim 1, wherein training the prediction network comprises:
    inputting a single interaction into each of a plurality of units of the prediction network, wherein the prediction network includes one unit to generate the output.

12. The method of claim 1, wherein training the prediction network comprises:
    comparing an output of the prediction network to the result of the sequence; and
    adjusting parameters of the prediction network based on the comparing.

13. The method of claim 1, further comprising:
    receiving an input from the user interface;
    inputting the input into the prediction network; and
    outputting the next user interaction from the prediction network.

14. The method of claim 13, further comprising:
    performing an action on the user interface based on the predicted next user interaction.

15. The method of claim 13, further comprising:
    inputting previous inputs into the prediction network along with the received input to output the next user interaction.

16. The method of claim 1, wherein the plurality of sequences are generated according to a step size, wherein a first sequence overlaps with a second sequence, and wherein the step size defines a number of interactions between a first interaction of the first sequence and a first interaction of the second sequence.

17. The method of claim 1, wherein the neural network comprises a recurrent neural network that is trained based on the plurality of sequences rather than a single interaction.

18. The method of claim 1, wherein the neural network comprises a long-short term memory neural network that is trained based on the plurality of sequences rather than a single interaction.

19. A non-transitory computer-readable storage medium containing instructions, that when executed, control a computer system to be operable for:
    receiving a set of interactions regarding interactions with an application;
    generating a plurality of sequences from the set of interactions, wherein each sequence includes multiple interactions;
    generating a plurality of results for the plurality of sequences, wherein a result in the plurality of results is a result for a sequence in the plurality of sequences; and
    training a prediction network using the plurality of sequences and the plurality of results, wherein the prediction network is usable to predict a next user interaction on the application when being used on a user interface,
    wherein a maximum length of each sequence is defined according to a business process related to the application, and
    wherein the prediction network comprises a neural network that is trained based on the plurality of sequences, wherein the maximum length reduces a raw data size for training the neural network.

20. An apparatus comprising:
    one or more computer processors; and
    a non-transitory computer-readable storage medium comprising instructions, that when executed, control the one or more computer processors to be configured for:
        receiving a set of interactions regarding interactions with an application;
        generating a plurality of sequences from the set of interactions, wherein each sequence includes multiple interactions;
        generating a plurality of results for the plurality of sequences, wherein a result in the plurality of results is a result for a sequence in the plurality of sequences; and
        training a prediction network using the plurality of sequences and the plurality of results, wherein the prediction network is usable to predict a next user interaction on the application when being used on a user interface,
    wherein a maximum length of each sequence is defined according to a business process related to the application, and
    wherein the prediction network comprises a neural network that is trained based on the plurality of sequences, wherein the maximum length reduces a raw data size for training the neural network.

* * * * *